(No Model.)

C. E. BILLINGS.
DRILL CHUCK.

No. 493,857. Patented Mar. 21, 1893.

Witnesses:
H. Mallner
Henry L. Rickard

Inventor:
C. E. Billings.
By his Attorney,
F. H. Richards

UNITED STATES PATENT OFFICE.

CHARLES E. BILLINGS, OF HARTFORD, CONNECTICUT.

DRILL-CHUCK.

SPECIFICATION forming part of Letters Patent No. 493,857, dated March 21, 1893.

Application filed May 10, 1892. Serial No. 432,473. (No model.)

*To all whom it may concern:*

Be it known that I, CHARLES E. BILLINGS, a citizen of the United States, residing at Hartford, in the county of Hartford and State of Connecticut, have invented certain new and useful Improvements in Drill-Chucks, of which the following is a specification.

This invention relates to that class of drill-chucks in which the drill is held by a pair of jaws that are simultaneously operated by means of a screw engaging the jaws longitudinally of the movement thereof.

The object of the invention is to provide a chuck of that class in which the jaws shall be rotatable in the chuck-body except for a key for holding the same in position; and to provide in one piece a screw for actuating the jaws and a key for retaining them from rotation; also, to provide a compound chuck of the class specified adapted for holding both straight-shank and taper-shank drills, and for holding pieces of irregular shape.

Figure 1:
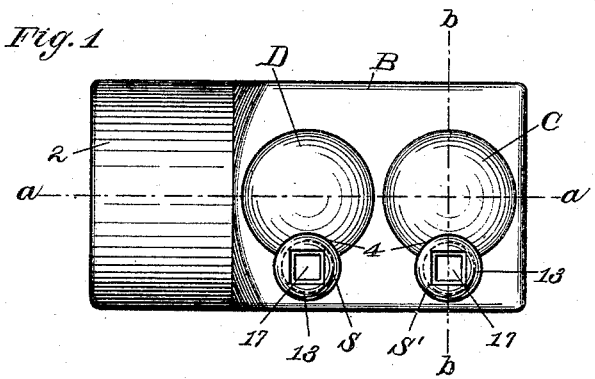
Figure 5:
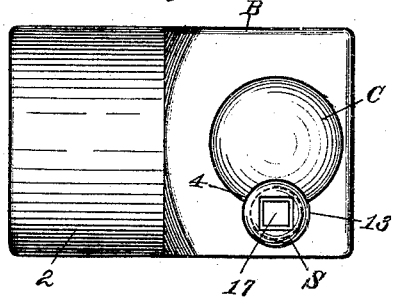
Figure 2:
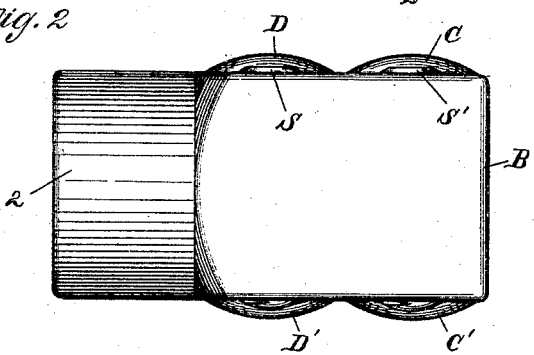
Figure 6:
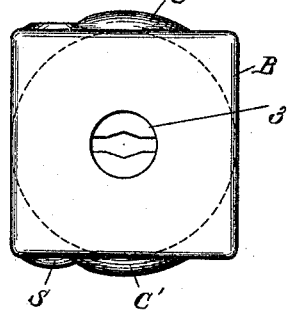
Figure 3:
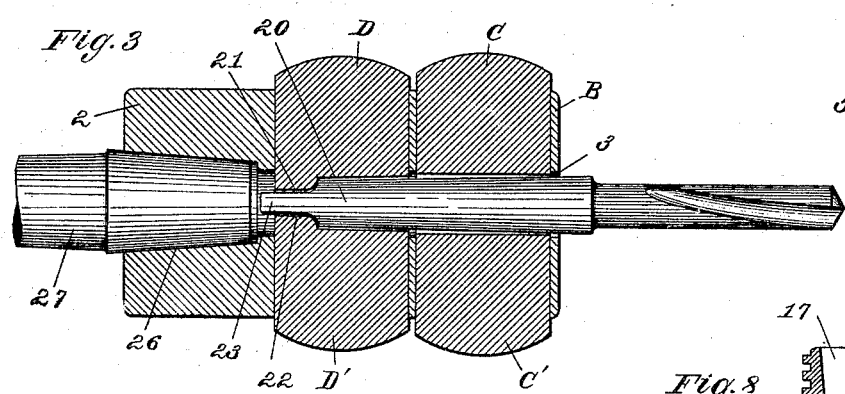
Figure 7:
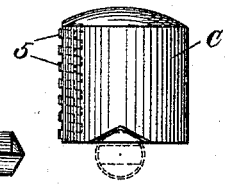
Figures 4, 9:
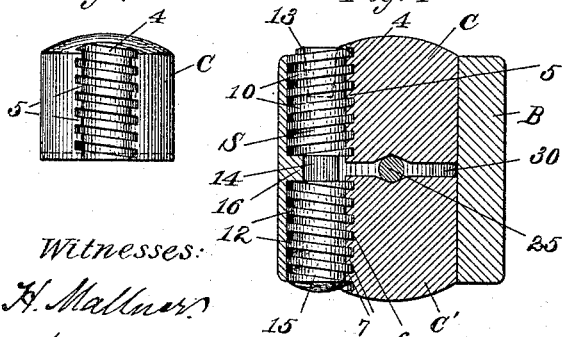
Figure 8:
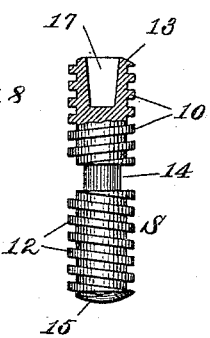

In the drawings accompanying and forming a part of this specification, Figure 1 is a plan view of a compound drill-chuck embodying my present improvements. Fig. 2 is a side elevation of the same. Fig. 3 is a longitudinal section, in line $a\,a$ of Fig. 1. Fig. 4 is a cross-sectional view, in line $b\,b$ of Fig. 1. Fig. 5 is a plan view of a chuck embodying a portion of my improvement and having only a single pair of jaws. Fig. 6 is a front view of the chuck, as seen from the right hand in Figs. 1 and 5. Fig. 7 is a front view of one of the jaws. Fig. 8 is a side view, partly in section, of one of the jaw-actuating screws. Fig. 9 is a side view of one of the jaws.

Similar characters designate like parts in all the figures.

The body, B, of my improved chuck consists of a single piece, usually made of solid steel. Said body has a hub, 2, or other properly shaped portion, whereby to support the same in the drilling machine ready for use. In the compound form of the chuck, the front portion of the body B is bored transversely thereof to receive the two pairs of chuck-jaws C and C', D and D', and also to receive the chuck-screws S and S' for actuating said pairs of jaws respectively. The face of the chuck has an opening, 3, therein, concentric with the axis of the chuck for receiving the drill-shank or other piece which is to be held therein.

The chuck-jaws have on one side thereof a threaded channel, 4 and 6, respectively, which channels are provided with the teeth, or threads, 5 and 7, respectively, for engaging with the screw-threads, 10 and 12, respectively, of the two ends, 13 and 15, of the aforesaid chuck-screw S. The middle portion of said screw S is grooved at 14, Figs. 4 and 8, to closely engage the central rib, or abutment, 16, Fig. 4, of the chuck-body. The end 13 of the chuck-screw has formed therein a square socket, 17, to receive the squared end of a wrench whereby the screw may be turned in a well-known manner.

In the manufacture of my improved chuck, the transverse bore, 30, for the chuck-jaws is made before the bore for the screw, so that said chuck-jaw-bore then presents a continuous cylindrical internal surface, and may therefore be reamed and lapped perfectly true and of exact size throughout the entire length thereof. This operation, it is well known, cannot be carried out in the manufacture of the drill-chucks heretofore in use, these having flat-sided grooves for receiving the chuck-jaws. Having finished as described the bore of the chuck-body, I may then fit thereto the jaws of the chuck, and afterward insert into the chuck-body bore the jig to be used for making the bore for receiving the screw S. The chuck-jaws being first fitted to place as described, are next grooved and threaded on one side thereof.

The assembling of the parts is accomplished as follows: The screw, (this being first properly fitted,) is placed in its seat, after which the chuck-jaws are inserted, one from each end of the bore thereof, in engagement with the extreme ends, respectively, of the screw, when this is turned to draw the jaws together into the proper working position, as shown in the drawings.

The operation of using the chuck will be readily understood from the drawings and the preceding description, without further explanation. When it is required to open the jaws, the screw is turned in one direction, and is turned in the other direction to close them. In the compound chuck shown in Figs.

1 to 4, inclusive, the forward pair of jaws, C and C', are shown constructed for receiving a cylindrical shank, and the rearward pair of jaws, D and D', are shown fitted to receive the tapered shank, 20, of a drill, and also as having the flatted portions, or faces, 21 and 22, for engaging the usual flatted projecting end, 23, of a tapered drill-shank. When a taper-shank drill is held in the jaws of the compound chuck, as indicated in the sectional view, Fig. 3, the rearward jaws D and D' close "fairly" onto the same, while the forward jaws only bear against said shank at the forward edges of said jaws; but this is sufficient in practice for effectually holding the drills, and, as hereinbefore pointed out, provides means for holding properly the straight-shank drills now so commonly used, especially for drills of comparatively small diameters, as indicated at 25, Fig. 4. The chuck-hub 2 may be bored as at 26, Fig. 3, to fit a spindle, as 27, by means of which the chuck may be carried in a drill-press or other machine.

My improved chuck has the advantage, not only of lower cost of construction when made with a given quality of workmanship, but the jaws can in practice be made to slide with sufficient freedom without any "play" whatever in the chuck-body; and this result, it is well known, cannot be obtained with the old kinds of chucks, without such an excessive cost of manufacture as to make the same impracticable.

By means of my present improvement, I am able to produce a chuck of a given size for a less cost than before, and at the same time obtain the improved quality described, bringing the chuck fairly within the class of instruments modernly known as "precision tools."

The jaw of my chuck is directly held by the chuck-body only against movement crosswise of the jaw; any rotative movement of the jaw about an axis parallel with its sliding movement is prevented by its engagement with the jaw-actuating screw itself, thereby entirely avoiding the angular faces heretofore used for that purpose, all of which are highly objectionable in a tool of this class.

Having thus described my invention, I claim—

1. In a drill-chuck, the combination with the body bored longitudinally to receive the drill-shank, and having therein a transverse cylindrical bore for receiving the chuck-jaws, of a pair of cylindrical chuck-jaws fitted to slide in said bore and having segmental internal threads on one side thereof, and the combined actuating-screw and guide-key seated in the chuck-body and engaging in the threaded grooves in the sides of said jaws, whereby the jaws are oppositely actuated and are held from rotation by the same element, substantially as described.

2. In a chuck, the combination with a chuck-body substantially as described, of two pairs of cylindrical chuck-jaws one forward of the other, the forward pair constructed to fit and hold straight shank drills and the rearward pair to fit and hold taper-shank drills, and means for actuating said pairs of chuck-jaws independently of each other, substantially as described.

3. In a drill-chuck, the combination with a chuck-body substantially as described, of the cylindrical chuck-jaws D and D' constructed with recesses on their shank-engaging faces to fit and hold taper-shank drills, and having rearward of said recesses flat faces, constructed for engaging the flatted projecting ends of said shanks, and means for actuating said jaws in opposite directions, respectively, substantially as described.

CHARLES E. BILLINGS.

Witnesses:
F. C. BILLINGS,
HENRY L. RECKARD.